United States Patent [19]

Bovee et al.

[11] 4,214,128

[45] Jul. 22, 1980

[54] METHOD AND APPARATUS FOR DEMULTIPLEXING MULTIPLEXED SEISMIC DATA

[75] Inventors: David B. Bovee, Katy; Ben B. Thigpen, Houston, both of Tex.

[73] Assignee: Western Geophysical Co. of America, Houston, Tex.

[21] Appl. No.: 946,897

[22] Filed: Sep. 28, 1978

[51] Int. Cl.² .......................... H04J 3/02; G01V 1/24
[52] U.S. Cl. ...................................... 370/112; 367/60; 370/68
[58] Field of Search ................ 340/15.5 DP, 15.5 FC, 340/7 R; 364/421; 179/15 AQ, 15 A, 15 AT; 343/5 DP; 367/60, 67

[56] References Cited

U.S. PATENT DOCUMENTS

| | | | |
|---|---|---|---|
| 2,958,039 | 10/1960 | Anderson | 340/15.5 DP |
| 3,327,062 | 6/1967 | Klund et al. | 179/15 AC |
| 3,806,886 | 4/1974 | McClellan et al. | 179/15 AQ |
| 3,883,725 | 5/1975 | Fort et al. | 340/15.5 DP |
| 3,914,553 | 10/1975 | Melindo et al. | 179/15 AT |
| 3,930,145 | 12/1975 | Fort et al. | 340/15.5 DP |
| 3,990,036 | 11/1976 | Savit | 367/67 |
| 4,012,719 | 3/1977 | Lau et al. | 179/15 A |
| 4,016,531 | 4/1977 | Cook et al. | 340/15.5 DP |
| 4,021,649 | 5/1977 | Fort et al. | 340/15.5 DP |
| 4,064,360 | 12/1977 | Koenig | 179/15 AQ |
| 4,084,151 | 4/1978 | Penner | 340/15.5 DP |
| 4,092,497 | 5/1978 | Laneau | 179/15 AT |

FOREIGN PATENT DOCUMENTS

| | | | |
|---|---|---|---|
| 2758797 | 7/1978 | Fed. Rep. of Germany | 179/15 A |
| 2225898 | 4/1973 | France | 370/112 |
| 41-6376 | 4/1966 | Japan | 179/15 AT |

OTHER PUBLICATIONS

Inose et al., "Time Division . . . Conversion," Aug. 1972, pp. 762-767, IEEE Trans on Commun., vol. COM-20, #4.

*Primary Examiner*—Nelson Moskowitz
*Attorney, Agent, or Firm*—William A. Knox

[57] ABSTRACT

In a multichannel seismic system, channel-sequential seismic data samples gathered during a first recording cycle are demultiplexed to sample-sequential format in a core memory. The core memory is divided into pages each of which is addressable in two dimensions by rows and columns as a rectangular matrix. The channel-sequential data samples are serially loaded into the respective pages in channel-sequential order by columns. At the end of the first recording cycle, the data are extracted from the respective pages by rows in sample-sequential order. As the data samples from the first recording cycle are being extracted by rows, data samples from a second recording cycle are loaded serially by rows into the respective pages that were vacated by the extracted data samples of the first recording cycle. Data samples from the second recording cycle are then extracted by columns in sample-sequential order and a third set of data samples is loaded serially in vacated elements of the columns, thereafter to be extracted by rows. The process is repeated for the data samples from additional recording cycles.

12 Claims, 2 Drawing Figures

METHOD AND APPARATUS FOR DEMULTIPLEXING MULTIPLEXED SEISMIC DATA

BACKGROUND OF THE INVENTION

Technical Field of the Invention

This invention is concerned with real-time demultiplexing of channel-sequential data samples as applied to multichannel seismic data acquisition systems.

Definitions

Channel-Sequential Order

In a multichannel system, a multiplexer successively samples the signal present at each channel in sequence, during a scan cycle. The series of data samples acquired from the respective channels during any one scan cycle constitutes a scan of data samples, or more simply, a scan. The resulting data samples in each scan are arranged in the same order in which the channels are sampled. Thus the sequence of data samples will be:

Ch-1, Smp-1; Ch-2, Smp-1; Ch-3, Smp-1; . . . ; Ch-m, Smp-1;
Ch-1, Smp-2; Ch-2, Smp-2; Ch-3, Smp-2; . . . ; Ch-m, Smp-2;
. . . , . . . ; . . . , . . . ; . . . , . . . ; . . . , . . . ; . . . , . . . ;
. . . , . . . ;
Ch-1, Smp-m; Ch-2, Smp-n; Ch-3, Smp-n; . . . ; Ch-m, Smp-n.

Data words acquired and recorded in channel-sequential order by sample number are said to be arranged in multiplexed format.

Multiplexer

A switching device having a plurality of inputs and a single output. During one sample interval, the multiplexer will scan each input channel in sequence, sample the signal there present, and deliver the sampled signal through an output bus to a signal processor. A sample and hold circuit is assumed to be incorporated into the multiplexer.

Memory Element

For purposes of this disclosure, a memory element is considered to be a location in a memory of sufficient size to contain the bytes that make up a complete data word. Usually four bytes are required.

Sample, Data Sample

A digital representation of the sign and magnitude of a sampled analog signal. Expressed as a series of bits, a sample may consist of as many as 32 bits, divided into four bytes of eight bits each. The data samples may be expressed in fixed-point or floating-point notation.

Sample-Sequential Order

Data samples are grouped by channels with the samples for each channel arranged in order of the sample number. Thus, the sequence of data samples will be:

Ch-1, Smp-1; Ch-1, Smp-2; Ch-1, Smp-3, . . . ; Ch-1, Smp-n;
Ch-2, Smp-1; Ch-2, Smp-2; Ch-2, Smp-3; . . . ; Ch-2, Smp-n;
. . . , . . . ; . . . , . . . ; . . . , . . . ; . . . , . . . ; . . . , . . . ;
. . . , . . . ;
Ch-m, Smp-1; Ch-m, Smp-2; Ch-m, Smp-3; . . . ; Ch-m, Smp-n.

Data words recorded in sample-sequential order by channel number are said to be arranged in demultiplexed format.

Sample Interval

The time interval between successive samplings of the same channel. The sample interval as used in seismic exploration work may range from ¼ millisecond to 4 milliseconds or more.

Scan Cycle

The time interval during which the signal present in each of a selected number of channels is sampled. The length of a scan cycle is equal to the sample interval.

Recording Cycle

The time interval during which the signals present in the respective input channels are sampled and recorded. Commonly, the recording cycle may be 8 to 16 seconds long. At a sample interval of two milliseconds, 4000 samples will be gathered from each input channel over a recording cycle of eight seconds.

Trace, Trace-Sequential

Data words in sample-sequential order. When converted to analog signals such data word sequences are displayed as oscillographic traces on a visual recording medium such as a seismogram. There will be as many traces on a single seismogram as there are data channels. The display may consist of wiggly traces, variable density traces, or variable area traces.

Technical Description of the Prior Art

Present-day seismic data acquisition systems may include more than one hundred signal input channels. The seismic signals present at each input channel are sampled periodically by a multiplexer at intervals such as one or two milliseconds (thousandths of a second) or at some multiple thereof. All of the channels are repeatedly scanned or sampled during a recording cycle of prescribed length. The data samples are processed and are then recorded on an archival storage medium in multiplexed format. For presentation as a visual display of underground earth layers, useful for geological interpretation, the data must be demultiplexed in sample- or trace-sequential order.

Traditionally, seismic data were recorded in the field on magnetic tape in multiplexed format. The tapes were then sent to a data processing center where the data were demultiplexed, further processed, and displayed on visual cross sections. Typically, the multiplexed, field-recorded data were read into a first mass-memory storage device such as a magnetic disc. Demultiplexing was performed by selecting the first sample from each channel from the first storage device and storing the respective samples in a second storage in locations that are separated from each other by a selected number of sequential address slots. Additional samples from the respective channels are then stored in locations that are shifted one address position from the corresponding previous address position. The selected number of sequential address slots is of course, equal to the number, plus one, of channels to be accommodated. It is evident that a very large mass memory is needed since, for a 128-channel system, with a sample interval of 1 millisecond and an 8-second recording cycle, more than one million data words are recorded per seismic record.

In recent years, the trend in seismic exploration has been to move much of the preliminary data processing, including demultiplexing of multiplexed data, to the site of the field operations. The data processing equipment must be mounted in a recording truck or, at sea, in a boat. Typically, bulk storage devices, such as magnetic discs are extremely bulky and somewhat delicate. Such devices prefer a benign environment, a condition not often found in the field.

As an alternative to a disc, a static memory may be used as bulk storage. But when an entire seismic record has been read into the storage, new data cannot be entered until the static memory has been emptied of the previous data. A considerable amount of lost time results. It would, of course, be possible to provide twin bulk storage units; new data could be written into one unit which old data is being read from the other unit. This practice doubles the cost of the preprocessing equipment as well as its physical volume.

One method for demultiplexing seismic data is disclosed in U.S. Pat. No. 4,016,531. In this system, a magnetic disc is used. As a teaching of the necessity for demultiplexing multiplexed seismic data, this patent is incorporated herein by reference. Other teachings of the use of a magnetic disc for use in demultiplexing and preprocessing of seismic data will be found in U.S. Pat. Nos. 3,883,725 and 3,930,145. The objections cited above, of course, apply to these known prior-art systems.

SUMMARY OF THE INVENTION

It is an object of this invention to provide a method and apparatus for demultiplexing previously multiplexed data, in near real time, that will be economical of digital storage space.

In accordance with an aspect of this invention, a multichannel seismic data acquisition system includes a multiplexer for sampling the signals present at the respective input channels at desired sample intervals during a recording cycle. The samples are processed and digitized as data words in multiplexed format. A digital memory is provided. The memory elements are divided into pages, each of which is addressable in two dimensions by rows and by columns as a rectangular array. The number of rows and columns in each page is equal to the number of input channels. If the number of channels is equal to the number of samples per channel (ie M=N) only one page is needed. If the two are roughly equal, it may be best to pad out a square page by inserting dummy channels or dummy samples to achieve equality. During a first recording cycle, the samples are sequentially loaded by columns into the respective pages of memory in multiplexed format. At the end of the recording cycle, the samples are extracted sequentially from the respective pages by rows in demultiplexed format. As the samples from the first recording cycle are being extracted, new data samples in multiplexed format from a second recording cycle are sequentially loaded by rows into the memory elements that were vacated by the data samples of the first recording cycle. Samples from the second recording cycle are then sequentially extracted by columns in demultiplexed format, to allow subsequent serial loading, by columns, of data samples from a third recording cycle. The alternating steps of loading multiplexed samples by columns, extracting demultiplexed samples by rows, loading fresh multiplexed data by rows and extracting demultiplexed data by columns, may be continued for additional recording cycles.

In another aspect of this invention, samples are extracted several times faster than real time. An initialization buffer of a small number of pages is provided to receive samples from a subsequent recording cycle while the demultiplexed samples from a previous recording cycle are being extracted. The number of pages in the initialization buffer is a function of the ratio between the number of channels and the number of samples per channel as well as of the ratio between the sample loading rate and the sample extraction rate. If the data can reasonably be contained in one square page the speed of extraction can be equal to or greater than the speed of insertion of data without requiring any initialization buffers.

BRIEF DESCRIPTION OF THE DRAWINGS

Other objects, features and advantages of this invention will be better understood by reference to the appended description and the drawings wherein.

DETAILED DESCRIPTION OF THE PREFERRED EMBODIMENT

Figure 1:
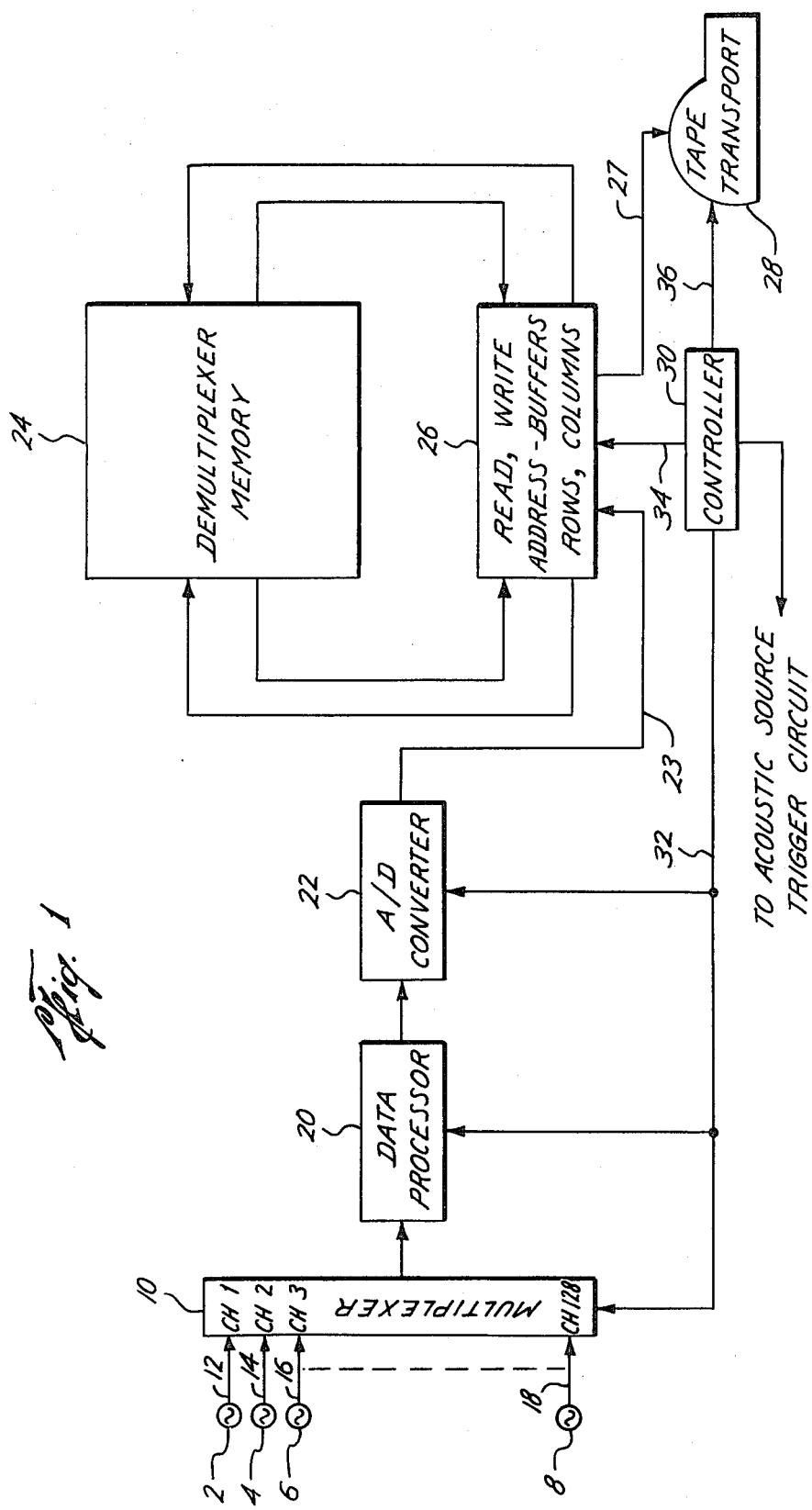
FIG. 1 is a block diagram showing the essential features of a multichannel seismic recording system with which this invention may be used.

Referring to FIG. 1 there is shown a multichannel seismic system employing the method of our invention.

A number of seismic sensors or sensor groups 2, 4, 6, 8, sensitive to seismic signals, are connected to a multiplexer 10 by suitable signal transmission lines 12, 14, 16, 18, to input channels Ch-1, Ch-2, Ch-3, ... Ch-128. For simplicity only the first three channels and the last channel, Ch-128, are shown. It is to be understood that more or fewer than 128 input channels may be employed.

A recording cycle is initiated, by triggering a source of seismic acoustic waves (not shown) which are detected by the sensors 2, 4, 6, 8. Multiplexer 10 then repeatedly scans input channels Ch-1 to Ch-128 at, for example, two millisecond intervals to sample the amplitude and polarity of the seismic signal there present. Each scan of multiplexer 10 results in a sequence of analog data signal samples in multiplexed, channel-sequential format. The multiplexed signal samples are filtered and gain-conditioned in data processor 20. The processed signals are then delivered to analog-to-digital converter 22 where each analog sample is digitized as a multibit digital data word representative of the amplitude and polarity of each processed sample. For the duration of a recording cycle, the digital data words are loaded over line 23 into demultiplexer memory 24 by the data distributor module 26. At the end of the recording cycle, the data words previously stored in demultiplexer memory 24 are extracted in demultiplexed format and read out over line 27 to an archival storage device 28 such as a magnetic tape. Extraction is accomplished by the data distributor module 26. As soon as the first recording cycle is completed a second recording cycle is begun, and new data words are loaded into demultiplexer memory 24 while old data is still being extracted. The mechanism by which multiplexed, channel sequential data words are demultiplexed to sample sequential format will be discussed in following paragraphs. For simplicity, lines 23 and 27, FIGS. 1 and 2 and the associated input/output lines such as 52, 54, 56, 58 are shown as single lines. In actual practice each line is a multi-line bus whose width is sufficient to accommodate the number of bits included in each data sample.

It is to be understood that the operational sequence of triggering a seismic source, initiating a recording cycle, processing and digitizing the resulting data, demultiplexing the channel-sequential data words and recording the data words on tape, is governed by a controller 30, of any well known type customarily supplied with conventional seismic recording systems. Control functions are exercised over control bus 32 to the multiplexer 10, data processor 20 and A/D converter 22; control bus 34 to data distributor module 26; and control bus 36 to tape transport 28.

Before considering the demultiplex memory logic 24, let us pause to discuss tape transport 28. A preferred tape transport for use with this invention is a Model 6250, made by Telex Corporation of Tulsa, Okla., employing standard one-half inch magnetic tape. This transport operates at a tape speed of 125 inches per second with a packing density of 6250 bytes per inch. Accordingly, the preferred tape transport will record data words at the rate of 781,250 bytes per second. At a sample interval of 2 ms (milliseconds) per channel with 128 input channels to be sampled per interval and four bytes per sample, the seismic system gathers data at the rate of 256,000 bytes per second. Thus the preferred tape recorder will read digital data words about three times faster than real time, relative to the seismic system multiplexer 10. As will be seen later, the ratio between the data acquisition rate of the seismic system and the data recording rate of the tape transport 28 is an important factor in determining the capacity, and hence the cost of demultiplexer memory 24.

Figure 2:
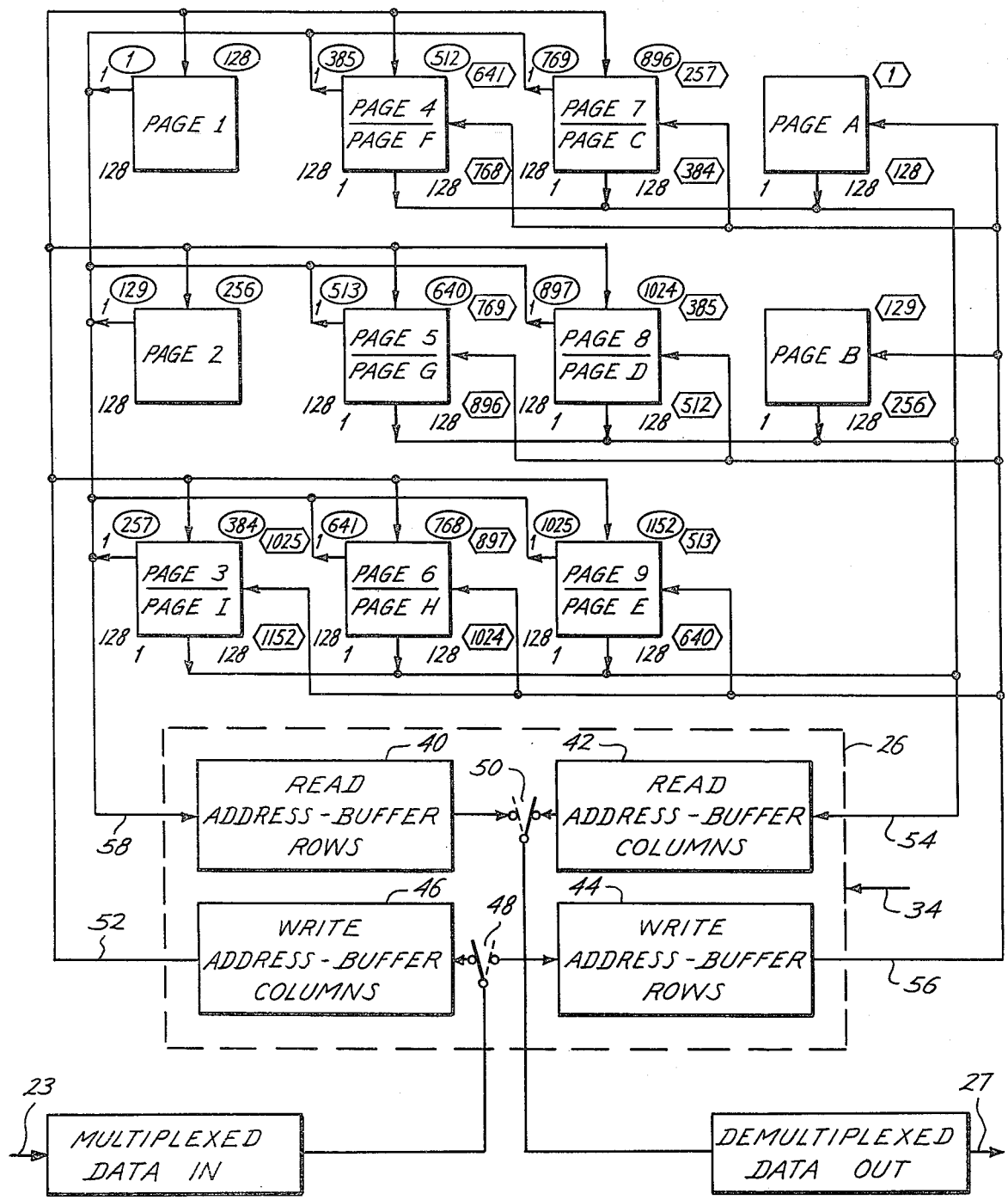
FIG. 2 is a detailed showing of the organization of the demultiplexer-memory portion of the system.

Referring now to FIG. 2, there is shown the structure of demultiplex memory 24. A preferred bulk storage device, useful for use with this invention, is a model 1223 MEGASTORE memory, made by the Ampex corporation, El Segundo, Calif. For purposes of illustration but not by way of restriction, it will be assumed that the seismic system includes 128 input channels all of which are to be sampled at 2 ms intervals. The total number of samples per channel will be assumed to be 1152, so that a a recording cycle will have a duration of 2,304 seconds.

Demultiplex memory 24 is divided into pages, each page being a rectangular array, addressable in two dimensions, by rows and by columns. The number of rows and columns is equal to the number of input channels, in this case, 128 such rows and columns. Nine pages are sufficient to contain all of the seismic data samples gathered during the exemplary recording cycle of 2,304 seconds. In FIG. 2 there are two groups of pages: Pages 1–9 and pages A–I. Some of the pages are common to both groups.

As explained previously, each scan cycle of multiplexer 10, produces a scan of 128 multiplexed, channel-sequential samples. The first scan cycle of the first recording cycle generates the first scan of samples for channels 1–128. These first samples are loaded into the first vertical column of page 1 of demultiplexer memory 24. By the end of the second scan, the second scan of samples for channels 1–128 will have been loaded into the second column of page 1. Multiplexed samples from the third through the 128th scan are loaded into the corresponding columns of page 1. The 129th through the 256th scans are loaded into the corresponding columns of page 2. The process is continued and finally multiplexed samples from the last, 1152nd scan are deposited in the last column of page 9. Observe that the column numbers for the respective pages are shown enclosed in ovals.

With the columns of pages 1–9 of demultiplexer memory 24 fully loaded, it will be seen that the contents of horizontal rows 1 of pages 1–9 taken in numerical sequence, contain the data samples for channel 1 in sample-sequential order. Accordingly, by extracting the samples from the respective pages by rows, the data samples are arranged in the desired demultiplexed format.

As soon as one recording cycle is complete, the samples having been loaded by columns, extraction of the data samples by rows, in demultiplexed format, is begun. Simultaneously a new recording cycle is initiated. Multiplexed samples from the first scan of the second recording cycle are loaded into row 1 of page A. The samples from the second scan of the second recording cycle are loaded into row 2, page A and so on until the 256th scan, when the multiplexed samples are loaded into row 256, page B. Row numbers are enclosed by diamonds for pages A–I. It will be remembered, of course, that no data were loaded into pages A and B during the first recording cycle, so that this area of demultiplexer memory 24 was empty at the time that the second recording cycle was initiated.

At this point, let us examine the timing sequence of the data loading and data extraction cycles. At a sample interval of 2 ms, 512 ms are required to fill pages A and B. During the course of the first 512 ms, data was extracted and tape transport 28 (FIG. 1) accepted the first 86 rows of demultiplexed samples from pages 1–9, which are the data corresponding to channels 1–86. This capability is possible because tape transport 28 can record data three times faster than real time. Accordingly new multiplexed data samples acquired during the 257th through the 343rd scans of the second recording cycle can be loaded, by rows, into page C at the same time that the old demultiplexed data are still being extracted from the lower rows of page C. Now, by the time that the first 86 rows of page C have been loaded, 29 more rows of old data samples will have been extracted. To continue, while the 29 additional rows of page C are being loaded, ten more have been unloaded, and finally, when data from the last, 128th row (channel 128) has been extracted, new data from the 376th scan of the second recording cycle is loaded into row 376 of page C. Thereafter the remaining pages D–I can be loaded by rows without interfering with data from a previous recording cycle because those pages are now empty.

After the multiplexed samples from the second recording cycle have been loaded in pages A–I, demultiplexed data samples are extracted by columns and new multiplexed samples from a third recording cycle may be loaded by columns in pages 1–9 following the same regimen discussed above for row-loading and row-extraction.

From the foregoing discussion, it will be appreciated that pages 1 and 2 and pages A and B form an initialization buffer in demultiplexer memory 24 to allow a short time delay for loading of new multiplexed data without interfering with the extraction of previously-stored data. The scheme disclosed represents a considerable savings in the size of the bulk storage that is required to demultiplex seismic data. All that is required is enough storage to contain data samples from one complete seismic recording cycle, plus a small initialization buffer. The required amount of initialization buffer storage is a function both of the ratio of the number of channels to the number of samples per channel and of the ratio between the sample loading rate and the tape transport recording rate which controls the sample-extraction rate. The faster the recording rate, the less storage space is required for the initialization buffer in the memory. There are of course practical limits to the recording speed imposed by tape transport speed, memory access time, data transfer rate, switching time, packing density in bytes per inch and the like.

Referring now to both FIGS. 1 and 2, in review, data samples are transmitted to data distributor module 26 over line 23. Data distributor module 26 includes a row READ address counter, a column READ address counter 42, a row WRITE address counter 44 and a column WRITE address counter 46. At the beginning of a recording cycle, controller 30 initializes the address counters to the starting addresses of the columns or rows to be loaded and unloaded and determines the required positions for switches 48 and 50. For example, for all odd-numbered recording cycles controller 30 might set switches 48 and 50 as shown in FIG. 2 so that multiplexed samples from the present odd-numbered recording cycle will be loaded by columns, pages 1–9, and demultiplexed samples from a previous even-numbered recording cycle will be unloaded by columns from pages A–I. For even-numbered recording cycles, new data are loaded by rows, pages A–I and old data are unloaded by rows, pages 1–9 as indicated by the dotted position of switches 48 and 50.

In operation, the first sample of the first scan of an odd-numbered recording cycle is directed to column 1, row 1, page 1, by WRITE address counter 46 over bus 52. Each data sample, of course is recieved by WRITE address counter 46, over line 23 from A/D converter 22. The second sample of the first scan is directed to column 1, row 2, page 1, etc., and finally the 128th sample of the first scan goes to column 1, row 128, page 1. The WRITE address counter is incremented suitably after loading of each sample until the last sample of the 1152nd scan is sent to row 128, column 1152, page 9.

Demultiplexed data are extracted by columns by READ address counter 42 for data recorded during a previous even-numbered recording cycle wherein the samples were loaded by rows. The first sample out for channel 1, is from column 1, row 1, page A. The second sample to be extracted is from column 1, row 2, page A and so on until the 128th sample is extracted from column 1, row 128, page A. Finally the last sample to be extracted for the first channel is from column 1, row 1152 of page I. A similar sequence continues for the remainder of the channels, the address counter being suitably incremented after each sample is extracted. Extracted data samples arrive from memory at READ address counter 42 over bus 54 and are transmitted through switch 50 to tape transport 28 over line 27.

For even-numbered recording cycles, multiplexed samples are sent to WRITE address counter 44 through line 23 and switch 48 (dotted position). Counter 44 then directs the data samples to the correct row addresses over bus 56. Demultiplexed samples from a previous odd-numbered recording cycle are extracted by rows by READ address counter 40 through bus 58 and thence through switch 50 (dotted position) to tape transport 28 via line 27.

The READ and WRITE address counters are conventional counter circuits and are well known to those skilled in the electronics art. Switches 48 and 50 are shown as mechanical switches but in practice would be high-speed digital switches.

Many modifications of the exemplary design herein disclosed will be apparent to those skilled in the art. In particular, the system as described may be expanded to include more input channels and to permit longer recording cycles. In the drawings, demultiplex memory 24 and its ancillary circuitry is shown coupled to a seismic data acquisition system. It will be evident to those skilled in the art, that demultiplex memory 24 could be coupled to a tape reader to demultiplex data that were previously recorded in the field on magnetic tapes or discs in multiplexed format. Accordingly, this invention is limited only by the appended claims.

We claim:

1. An improved method for demultiplexing a plurality of scans of multiplexed digital data samples from a first recording cycle of a multiple input-channel data acquisition system, from channel-sequential order by sample number to sample-sequential order by channel number, comprising the steps of:

assigning a plurality of memory elements in a digital memory to form a two dimensional rectangular array of rows and columns of elements;

sequentially loading each side scan of multiplexed data samples into said array by columns, a different column being selected for each scan; and sequentially extracting said column-loaded data samples from said array by rows in demultiplexed format, a different row being selected for each channel.

2. The improved demultiplexing method as defined in claim 1 further comprising the steps of:

sequentially loading a plurality of scans of multiplexed data samples from a second recording cycle into said array by rows as the memory elements of each said row become vacated by the extracted demultiplexed samples from said first recording cycle, a different row being selected for each scan; and sequentially extracting the row-loaded seismic samples from the second recording cycle from said array by columns in demultiplexed format, a different column being selected for each channel.

3. The improved demultiplexing method as defined by claim 2 further comprising the step of:

extracting said data samples from said array at a rate faster than the sample loading rate.

4. The improved demultiplexing method as defined in claim 3 further comprising the step of:

subdividing said rectangular array of memory elements into a plurality of pages that are addressable by rows and by columns in two dimensions, the number of rows and columns for each page being equal to the number of input channels of the seismic system.

5. The improved demultiplexing method as defined in claim 4 further comprising the step of:

assigning additional pages in said digital memory to provide an initialization buffer, the number of additional pages being a function of the ratio between the sample loading rate and the sample extraction rate, and being substantially fewer than the plurality of pages included in said rectangular array.

6. The improved demultiplexing method according to claim 5 and continuing the steps of loading multiplexed samples by columns, extracting demultiplexed column-loaded samples by rows and loading fresh multiplexed samples by rows, extracting demultiplexed row-loaded samples by columns, for a desired number of recording cycles.

7. In a seismic data acquisition system, said system having a plurality of input channels for receiving seismic signals, means for generating repeated data scans for sampling the signals present in said input channels in consecutive order during a recording cycle to provide digital data samples multiplexed in channel sequential order by sample number, the improvement comprising:

A digital memory having a plurality of memory elements that are arranged in a virtual rectangular array, the memory elements being addressable by rows and columns;

means for sequentially loading the data samples from each scan a recording cycle into said array by columns, a different column being selected for each scan; and means for sequentially extracting said column-loaded data samples from said array by rows, to provide demultiplexed data in sample-sequential order by channel number, a different row being selected for each channel.

8. The improvement as defined by claim 7 further comprising:

means for loading a plurality of data samples from each scan of another recording cycle into said arrays by rows as the memory elements of each row become vacated by the extracted signals of the previous recording cycle, a different row being selected for each scan; and means for sequentially extracting the row-loaded data samples from said array by columns to provide demultiplexed data in sample-sequential order by channel number, a different column being selected for each channel.

9. The improvement as defined by claim 8 wherein:

said rectangular array of elements is subdivided into a plurality of pages the memory elements of which are addressable by rows and columns, the number of rows and the number of columns being equal to the number of input channels.

10. The improvement as defined in claim 9 further comprising:

an initialization buffer in said memory consisting of a number of additional pages, the number being equal to the ratio between the sample loading rate and the sample extraction rate, the number being substantially fewer than the plurality of pages included in said rectangular array.

11. A method for rearranging a plurality of sets of data samples ordered in a first undesired format, into a second desired format, comprising the steps of:

assigning a plurality of memory elements in a digital memory to form a two-dimensional rectangular array of rows and columns of consecutive elements;

writing the ordered data samples of a first set in consecutive order into said array by columns;

reading the data samples of the first set in consecutive order from said array by rows; and before the reading of said first set of data samples is completed, writing the ordered data samples of a second set in consecutive order by rows.

12. The method as defined by claim 11 comprising the further steps of:

reading the data samples of said second set in consecutive order from said array by columns; and continuing, for subsequent sets of data samples, the steps of alternately writing by columns, reading by rows and writing by rows, reading by columns, each said writing step always being initiated before the preceeding reading step is completed.

* * * * *